United States Patent
Murofushi

(10) Patent No.: US 6,332,690 B1
(45) Date of Patent: *Dec. 25, 2001

(54) LIQUID CRYSTAL DISPLAY WITH CURVED LIQUID CRYSTAL SCREEN

(75) Inventor: Eiji Murofushi, Shizuoka-ken (JP)

(73) Assignee: Yazaki Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,099

(22) Filed: Oct. 21, 1998

(30) Foreign Application Priority Data

Oct. 22, 1997 (JP) ..................................................... 9-290094

(51) Int. Cl.[7] ................. F21V 7/04; F21V 9/16; G02F 1/1335
(52) U.S. Cl. ................. 362/31; 362/84; 349/64; 349/65
(58) Field of Search ................................. 349/63, 65, 62, 349/64, 112; 362/84, 26, 27, 31, 308, 278, 320

(56) References Cited

U.S. PATENT DOCUMENTS

| | | | |
|---|---|---|---|
| 4,804,254 | * | 2/1989 | Doll et al. ........................... 350/344 |
| 5,613,751 | * | 3/1997 | Parker et al. ........................ 362/31 |
| 5,847,783 | * | 12/1998 | Hiramoto et al. .................... 349/69 |
| 5,993,020 | * | 2/1999 | Koike ..................................... 362/31 |

* cited by examiner

Primary Examiner—Cassandra Spyrou
Assistant Examiner—Jared Treas
(74) Attorney, Agent, or Firm—Finnegan, Henderson, Farabow, Garrett & Dunner, L.L.P.

(57) ABSTRACT

A flexible light emitting sheet is curved along a curved liquid crystal screen constituting a meter display, and comprises one of a single sheet of a flexible transparent resin with a system of monoxide silicon particles mixed therein, an electroluminescent substance relatively high of brightness, and a flexible transparent resin sheet and a set of light emitting diodes arranged thereon in a plane conforming manner.

31 Claims, 2 Drawing Sheets

FIG.1
PRIOR ART
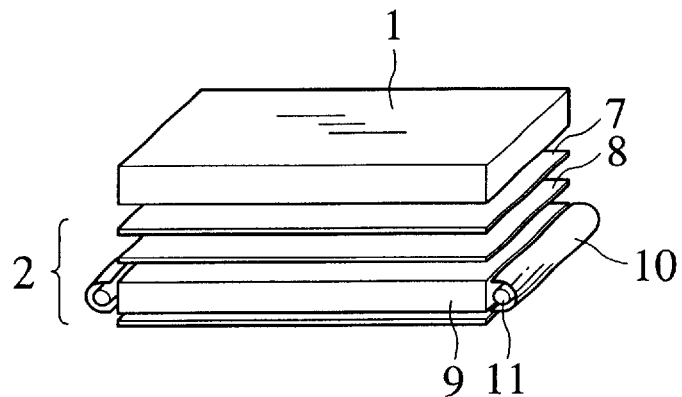
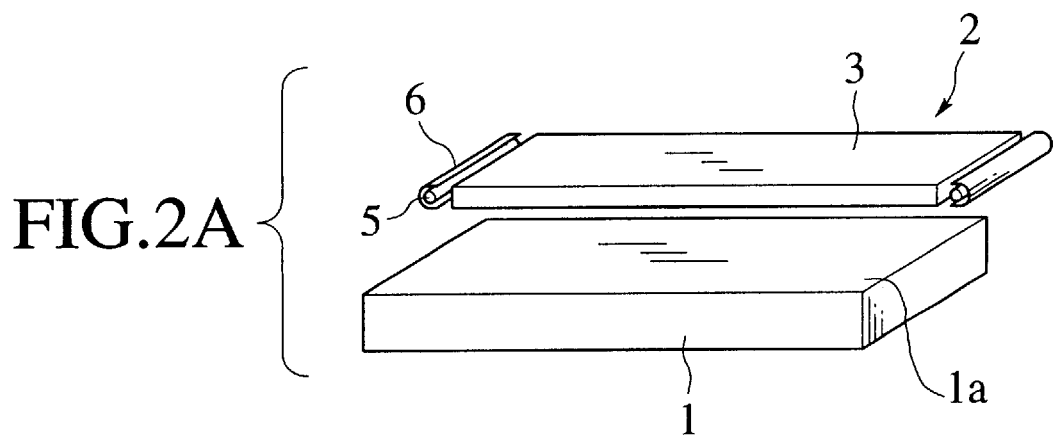
FIG.2A
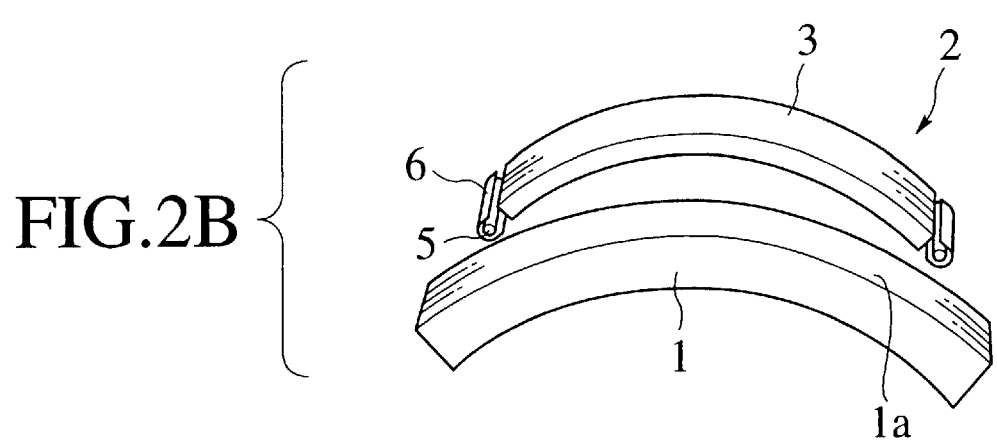
FIG.2B

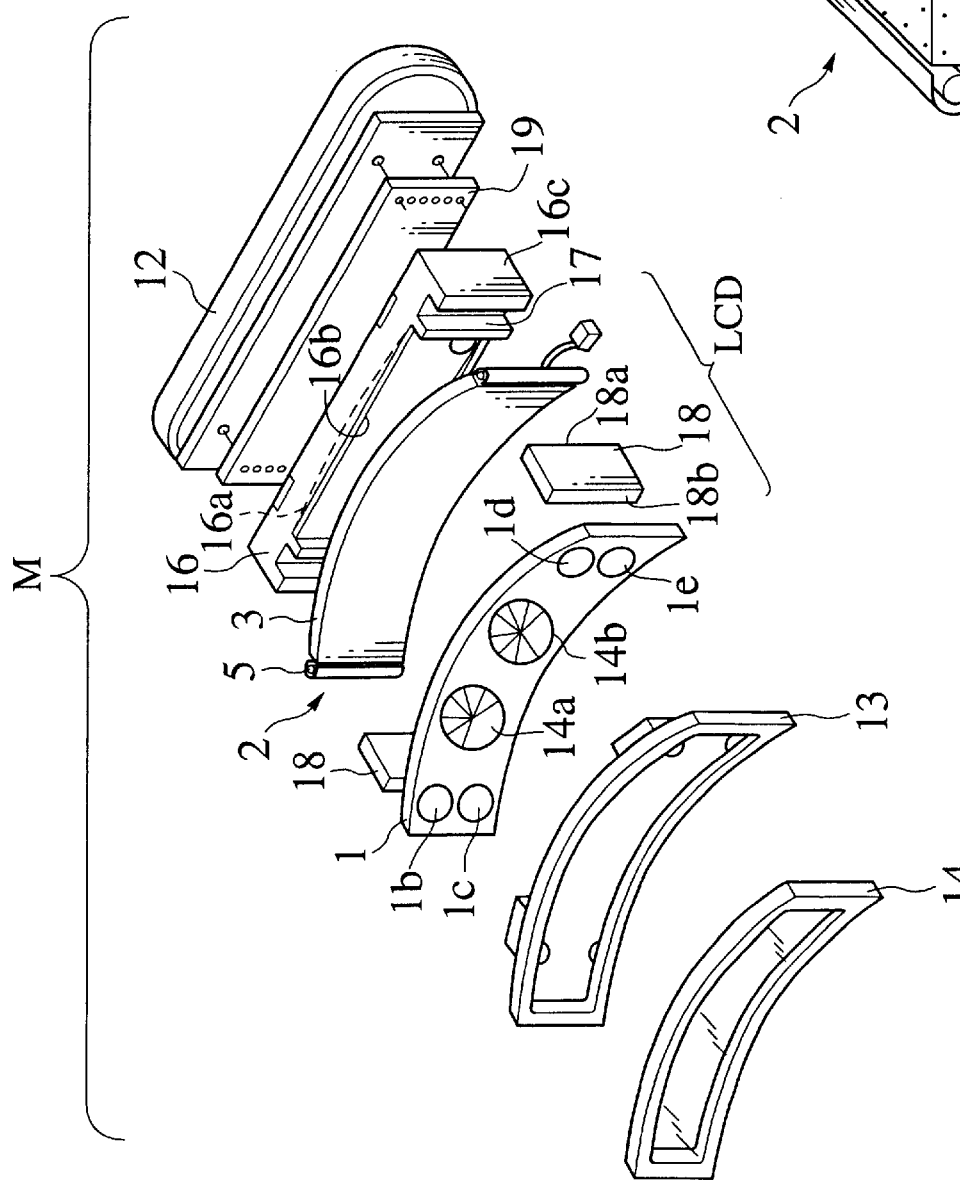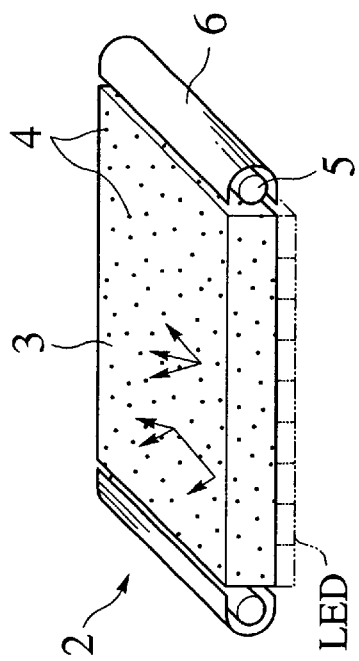

LIQUID CRYSTAL DISPLAY WITH CURVED LIQUID CRYSTAL SCREEN

BACKGROUND OF THE INVENTION

1. Field of the Invention

The present invention relates to a "liquid crystal (hereafter sometimes called LC) display" (hereafter sometimes "LCD"), and particularly, to an LCD with a curved LC screen.

2. Description of Relevant Art

FIG. 1 illustrates a conventional LCD with a typical flat configuration.

The conventional LCD comprises a flat LC screen 1 and a flat back light unit 2. The LC screen 1 is comprised of a matrix of LC pixels each including a pair of transparent electrodes with an intervening body of LC and an associated thin film transistor circuit, and a corresponding lattice of horizontal and vertical signal lines. The back light unit 2 is comprised of a light source 11, a reflector 10, a light transmitting plate 9, a scattering or distributing sheet 8, and a prism sheet 7.

A recent LC screen is flexible, and naturally deforms along a curved surface, without undue distortion. However, the back light unit 2 is inflexible, as the light transmitting plate 9 has a varied optical characteristic if flexed.

SUMMARY OF THE INVENTION

The present invention has been achieved with such points in view.

It therefore is an object of the present invention to provide an LCD with a curved LC screen, permitting a curved picture to be displayed without suffering from a varied or non-uniform optical characteristic.

To achieve the object, a first aspect of the invention provides an LCD comprising a curved LC screen and a flexible light emitting sheet curved along the curved LC screen.

According to this aspect of the invention, a flexible light emitting sheet constitutes a back light curved along a curved LC screen, with a flexible adaptation to a variety of desirable configurations in a simplified constitution. The light emitting sheet may be a single, even for a curved meter display such as for an instrument panel of an automobile.

According to a second aspect of the invention, the flexible light emitting sheet comprises a single sheet of a flexible transparent resin with a system of monoxide silicon particles mixed therein.

According to this aspect of the invention, a flexible body of a transparent resin is configured as a single sheet, and adapted for brightness control, an even distribution and a transmission of light, to provide a thin display with a simple constitution.

According to a third aspect of the invention, the flexible light emitting sheet comprises an electroluminescent substance relatively high of brightness.

According to this aspect of the invention, a light emitting sheet flexible to provide a curved light emitting surface is rendered electroluminescent with high brightness, and can emit a competent quantity of light without assistance from an additional light source.

According to a fourth aspect of the invention, the flexible light emitting sheet comprises a flexible transparent resin sheet and a set of light emitting diodes (hereafter, simple "LED") arranged thereon in a plane conforming manner.

According to this aspect of the invention, a set of LED's for a planer application are arranged in conformity with a configuration of a back side of a flexible transparent resin sheet in a facilitated manner.

According to a fifth aspect of the invention, the LCD further comprises a meter display panel for a vehicle, the meter display panel including the LC screen.

According to this aspect of the invention, a meter display panel of a vehicle has a curved display surface, of which some essential part may appear in a normal or straight sight angle of any passenger in the vehicle, allowing for the passenger to have a significantly relaxed, service-sharing, tireless observation, in particular in a rally or the like.

According to a sixth aspect of the invention, the LCD further comprises a connector housing member formed with a curved front face for the flexible light emitting sheet to rest thereon.

According to this aspect of the invention, a curved light emitting sheet fits on a curved front face of a connector housing member that may be employed for electrical connection to the LC screen.

BRIEF DESCRIPTION OF THE ACCOMPANYING DRAWINGS

The above and further objects and novel features of the present invention will more fully appear from the following detailed description when the same is read in conjunction whit the accompanying drawings, in which:

FIG. 1 is a perspective exploded view of a conventional LCD;

FIG. 2A is a perspective view of components of an LCD according to an embodiment of the invention, as they are flat;

FIG. 2B is a perspective view of the components of the LCD of FIG. 2A, as they are curved;

FIG. 3 is a perspective exploded view of a back light unit for an LCD for a meter for automobiles according to an embodiment of the invention; and FIG. 4 a perspective view of a back light unit for an LCD according to an embodiment the invention.

DETAILED DESCRIPTION OF THE PREFERRED EMBODIMENTS

There will be detailed below the preferred embodiments of the present invention with reference to the accompanying drawings. Like members are designated by like reference characters.

FIG. 2A shows an LC screen 1 or panel or cell in the form of a substantially rectangular plate with a thickness and a back light unit 2 in the form of a substantially rectangular plate with accessories at both sides, as they are left flat and extend straight, as principal components of an LCD according to an embodiment of the invention. The back light unit 2 is composed of a single sheet 3 of a flexible resin assisted for light emission with a pair of light sources 5 extending along both sides thereof and protected with a pair of reflection covers 6. Rays of light transmitted from the light sources 5 are emitted from the sheet 3. A light emitting side of the resin sheet 3 faces a light receiving back side 1a of the LC screen 1.

FIG. 2B shows the LC screen 1, as it is curved to provide a rearwardly arcuate display surface, and the back light unit 2, as it is curved along the back side surface 1a of the LC screen 1 substantially parallel to the arcuate display surface.

The display surface of the LC screen 1 may be curved forwards, as well as rearwards, to be a wholly or partially quadratic or higher-degree surface, such as a cylindrical surface about a vertical, oblique or horizontal axis, a parabolic or highperbolic surface, or a spherical or spheroidal surface, alone or in combination, as well as in other embodiments of the invention.

FIG. 3 is an exploded view of a meter apparatus M for vehicles including an LCD according to an embodiment of the invention. The meter apparatus M comprises a rearwardly curved front or observation glass assembly 14, a rearwardly curved reverse assembly 13 as a supporting distance frame disposed behind the observation glass assembly 14, the LCD including a rearwardly curved LC screen 1 as a meter board disposed behind the reverse assembly 13 and a rearwardly curved back light unit 2 with a pair of rubber shielded flexible conductor combination members 18 at both sides, an LCD holder 16 as a straight support frame disposed behind the back light unit 2, a flat printed circuit board 19 disposed behind the LCD holder 16, and a shaped meter casing member 12 substantially horizontally extending behind the circuit board 19.

The LC screen 1 displays, on its front face, at a left side thereof e.g. a signal indicator 1b, an alarm indicator 1c and a speedometer 14a, and at a right side thereof e.g. a temperature gauge 1d, a fuel gauge 1e and a tachometer 14b. A driver naturally looks the left side, and a navigator naturally looks the right side, as the LC screen 1 is symmetrically curved with respect to an imaginary central vertical plane.

The back light unit 2 comprises a rearwardly curved sheet 3 of a flexible transmitted-light emitting resin, and a pair of left and right lighting devices each including a sheet-edge illuminating light source 5 connected via a cord to a power supply (not shown).

The LCD holder 16 is constituted as an LCD supporting connector assembly including an insulating rigid connector housing member formed with: a rearwardly curved central front face 16a for a back side of the curved light emitting sheet 3 to rest thereon; a pair of upper and lower straight side portions 16b for holding and supporting upper and lower edges of the curved light emitting sheet 3; and a pair of left and right connector housing portions 16c cooperating at their inner sides with the front face 16a and respective inner sides of the upper and lower side portions 16b to define an arcuate accommodation space for accommodating therein the curved light emitting sheet 3. The accommodation space may accommodate therein the LC screen 1, as well. Each connector housing portion 16c is formed with a vertically extending front slot 17 to fit on a rear connector portion 18a of the conductor combination member 18. Pin connectors (not shown) are provided through the connector housing 16c for electrical connection between control circuits on the printed circuit board 19 and the rear connector portion 18a of the conductor combination member 18, which member 18 has a front connector portion 18b adapted for electrical connection to signal lines in the LC screen 1, and LC control signals are conducted from the printed circuit board 19 via the pin connectors and the conductor combination member 18 to the signal lines in the LC screen 1.

The back light unit 2 may comprise a rearwardly curved rectangular sheet of a flexible body of an electroluminescent substance, such as a curved electroluminescent panel or cell, and a drive circuit for application of a sufficient voltage for excitation of the substance to produce and emit a necessary density of light flux.

It will be seen that an LCD according to another embodiment of the invention may comprise an entirety of the meter apparatus M.

FIG. 4 shows a flexible back light unit 2 according to an embodiment of the invention, as it is left flat for comprehension. This back light unit is identical to or may substitute for a respective back light unit in the embodiments described. The back light unit 2 comprises a rectangular single sheet 3 of a flexible transmitted-light emitting resin body, and a pair of left and right lighting devices each composed of a sheet-edge illuminating straight light source 5 and a back reflector 6 semi-circular or parabolic in section about the straight light source. The flexible resin body comprises a body of a flexible synthetic resin, such as a polyethylene, with a uniformly scattered system or pattern of monoxide silicon (SiO) particles 4 mixed therein. The particles 4 have a refractive index different from that of the synthetic resin. The single sheet 3 is adapted for a brightness control or light density smoothing, a light scattering distribution, and a light transmission for emission, as illustrated by arrows.

As illustrated by two-dot chain lines in FIG. 4, the lighting devices may be replaced by a matrix of LED's applied over a back side of the flexible light emitting sheet 3 in a plane conforming manner or pattern.

While preferred embodiments of the present invention have been described using specific terms, such description is for illustrative purposes, and it is to be understood that changes and variations may be made without departing from the spirit or scope of the following claims.

What is claimed is:

1. A liquid crystal display device comprising:
    a curved liquid crystal screen having a rearwardly arcuate display surface and a light receiving back side surface;
    a flexible light emitting sheet curved along the light receiving back side surface of the curved liquid crystal screen and substantially parallel to the rearwardly arcuate display surface so as to display a curved picture having uniform optical characteristics; and
    wherein the curved light emitting sheet comprises a single sheet of a flexible transparent resin having a first refractive index with a system of monoxide silicon particles mixed therein in a pattern configured for compensating for the degree of curvature of the curved light emitting sheet so as to uniformly distribute light passing through the curved light emitting sheet and the light receiving back side of the curved liquid crystal screen, each of the monoxide silicon particles having a second refractive index different from the first refractive index.

2. The liquid crystal display device of claim 1, wherein the curved light emitting sheet comprises an electroluminescent substance configured for emitting light having a relatively high level of brightness.

3. The liquid crystal display device of claim 2, further comprising a drive circuit configured for exciting the electroluminescent substance such that the curved light emitting sheet emits light have a predetermined light density flux.

4. The liquid crystal display device of claim 1, wherein the flexible light emitting sheet comprises:
    a flexible transparent resin sheet; and
    a set of light emitting diodes arranged thereon in a plane conforming pattern configured for uniformly distributing light passing through the curved light emitting sheet and the rearwardly arcuate display surface.

5. The liquid crystal display device of claim 1, wherein the curved liquid crystal screen includes at least one vehicle display indicator located on the rearwardly arcuate display surface.

6. The liquid crystal display device of claim 5, wherein the liquid crystal screen defines a longitudinal axis and a central axis perpendicular to the longitudinal axis, and is configured to be symmetrically curved relative to the central axis.

7. The liquid crystal display device of claim 5, wherein the at least one vehicle display indicator comprises a plurality of vehicle display indicators including a signal indicator, an alarm indicator, a speedometer, a temperature gage, a fuel gage, and a tachometer.

8. The liquid crystal display device of claim 1, further comprising a connector housing member formed with a curved front face configured for supporting a back side of the curved light emitting sheet thereon.

9. The liquid crystal display device of claim 8, wherein the connector housing member includes upper and lower sides portions configured for engageably supporting upper and lower edges of the curved light emitting sheet.

10. The liquid crystal display device of clam 1, wherein the rearwardly arcuate display surface faces a first direction, the light receiving back side faces a second direction, and the curved light emitting sheet comprises a rearwardly arcuate light emitting surface facing the light receiving back side.

11. The liquid crystal display device of claim 1, wherein the liquid crystal screen defines a longitudinal axis and a central axis perpendicular to the longitudinal axis, and is configured to be symmetrically curved relative to the central axis.

12. The liquid crystal display device of claim 1, wherein the pattern of monoxide silicon particles of the curved light emitting sheet is configured for allowing the rearwardly arcuate display surface to display the curved picture having uniform light brightness, density, and refractive characteristics.

13. A liquid crystal display device comprising:
a curved liquid crystal screen having a rearwardly arcuate display surface, a light receiving back side surface, and at least one vehicle display indicator located on the rearwardly arcuate display surface;
a flexible light emitting sheet curved along the light receiving back side surface of the curved liquid crystal screen and substantially parallel to the rearwardly arcuate display surface such that the at least one vehicle display indicator displays a curved picture having uniform optical characteristics; and
wherein the curved light emitting sheet comprises a single sheet of a flexible transparent resin having a first refractive index with a system of monoxide silicon particles mixed therein in a pattern configured for compensating for the degree of curvature of the curve light emitting sheet so as to uniformly distribute light passing through the curved light emitting sheet and the light receiving back side of the curved liquid crystal screen, each of the monoxide silicon particles having a second refractive index different from the first refractive index.

14. The liquid crystal display device of claim 13, wherein the pattern of monoxide silicon particles of the curved light emitting sheet is configured for allowing the rearwardly arcuate display surface to display the curved picture having uniform light brightness, density, and refractive characteristics.

15. The liquid crystal display device of claim 13, wherein the curved light emitting sheet comprises an electroluminescent substance configuring for emitting light having a relatively high level of brightness.

16. The liquid crystal display device of claim 13, wherein the at least one vehicle display indicator comprises a plurality of vehicle display indicators including a signal indicator, an alarm indicator, a speedometer, a temperature gage, a fuel gage, and a tachometer.

17. The liquid crystal display device of claim 13, further comprising a connector housing member having a curved front face configured for supporting a back side of the curved light emitting sheet thereon and upper and lower sides portions configured for engageably supporting upper and lower edges of the curved light emitting sheet.

18. The liquid crystal display device of claim 13, wherein the liquid crystal screen defines a longitudinal axis and a central axis perpendicular to the longitudinal axis, and is configured to be symmetrically curved relative to the central axis.

19. The liquid crystal display device of claim 13, further comprising a rearwardly curved observation glass assembly and a rearwardly curved reverse assembly adjacent to the rearwardly curved arcuate display surface of the liquid crystal screen.

20. The liquid crystal display device of claim 13, further comprising:
a holding device configured for supporting a convex side of the curved light emitting sheet;
a circuit board device connected to a pin connector of the holding device for providing an electrical connection between the circuit board device and the curved liquid crystal screen; and
a casing member configured for supporting the circuit board device and the holding device.

21. A liquid crystal display device comprising:
a curved liquid crystal screen having a rearwardly arcuate display surface and a light receiving back side surface;
a flexible light emitting sheet curved along the light receiving back side surface of the curved liquid crystal screen and substantially parallel to the rearwardly arcuate display surface so as to display a curved picture having uniform optical characteristics; and
wherein the curved light emitting sheet comprises a sheet of flexible transparent film containing a pattern of monoxide silicon particles configured for compensating for the degree of curvature of the curved light emitting sheet and uniformly distributing light passing through the curved light emitting sheet and the light receiving back side of the curved liquid crystal screen.

22. The liquid crystal display device of claim 21, wherein the flexible transparent film has a first refractive index and each of the monoxide silicon particles have a second refractive index different from the first refractive index.

23. The liquid crystal display device of claim 21, wherein the pattern of monoxide silicon particles of the curved light emitting sheet compensates for the degree of curvature of the curved light emitting sheet so as to allow the rearwardly arcuate display surface to display a curved picture having uniform light brightness, density, and refractive characteristics.

24. The liquid crystal display device of claim 21, wherein the liquid crystal screen defines a longitudinal axis and a central axis perpendicular to the longitudinal axis and is configured to be symmetrically curved relative to the central axis.

25. A liquid crystal display device comprising:
an arcuate liquid crystal screen having an curved display surface, and a curved light receiving surface;
an arcuate light emitting sheet having a curved light emitting surface extending substantially parallel to the curved light receiving surface of the liquid crystal screen, and a light incident surface for receiving light from a light source; and wherein the arcuate light emitting sheet comprises a transparent resin having a first refractive index, and a pattern of monoxide silicon particles having a second refractive index different from the first refractive index and arranged between the curved light emitting surface and the light incident surface of the arcuate light emitting sheet so as to evenly transmit light passing from the light incident surface to the curved light emitting surface and uniformly display light from the curved light emitting surface of the arcuate light emitting sheet.

26. The liquid crystal display device of claim 25, wherein the light incident surface of the arcuate light emitting sheet is curved and the light source comprises of matrix of light emitting diodes applies to the curved light incident surface.

27. The liquid crystal display device of claim 25, wherein the pattern of monoxide particles is configured to control a light density of the light displayed from the curved light emitting surface of the arcuate light emitting surface.

28. The liquid crystal display device of claim 25, wherein the pattern of monoxide particles is configured to provide a predetermined light scattering distribution of light displayed from the curved light emitting surface of the arcuate light emitting surface.

29. The liquid crystal display device of claim 25, wherein the pattern of monoxide particles is configured to permit the curved display surface of the arcuate liquid crystal screen to display a curved picture having uniform optical characteristics.

30. The liquid crystal display device of claim 25, wherein the liquid crystal screen defines a longitudinal axis and a central axis perpendicular to the longitudinal axis and is shaped to be symmetrically curved relative to the central axis.

31. The liquid crystal display of claim 25, further comprising:

a holding device arranged to support a convex side of the arcuate light emitting sheet;

a circuit board device connected to a pin connector of the holding device so as to provide an electrical connection between the circuit board device and the curved liquid crystal screen; and a casing member arranged to support the circuit board device and the holding device.

* * * * *